INVENTORS
ARTHUR J. STANTON
DAVID F. ANDERSON
GEORGE B. BONIFACE
BY
ATTORNEYS

United States Patent Office 3,152,511
Patented Oct. 13, 1964

3,152,511
GUN EJECTION MECHANISM
Arthur J. Stanton, Bethesda, Md., David F. Anderson, McLean, Va., and George B. Boniface, Parkland, Md., assignors to the United States of America as represented by the Secretary of the Navy
Filed June 3, 1957, Ser. No. 663,321
10 Claims. (Cl. 89—33)
(Granted under Title 35, U.S. Code (1952), sec. 266)

The invention described herein may be manufactured and used by or for the Government of the United States of America for governmental purposes without the payment of any royalties thereon or therefor.

This application discloses and claims a portion of the complete gun system disclosed and claimed in copending application Serial No. 663,319, filed June 3, 1957, for Rapid Fire Gun.

The present invention relates to an ammunition case ejection apparatus for a projectile directing and firing system which includes a low velocity, rapid fire gun and mount therefor. More particularly, this invention is directed to such an apparatus well adapted for use with a weapon suitable for a saturation zone type of protective or assault fire and which is especially well adapted for shipboard antiaircraft use.

Heretofore, antiaircraft guns of both large and small calibers have been devised for employment against high and low altitude attacking planes. Although the large caliber guns are effective at high altitudes when properly used, these guns are generally ineffective at low altitudes and short ranges because, among other reasons, of their slow rate of fire and the more effective evasive action taken by aircraft at low altitudes. Consequently, guns generally in use against low flying aircraft have been of a small caliber and in the machine gun class in order to obtain a rapid rate of fire and cope with the evasive action of aircraft attempting to avoid the zone of fire. However, the use of armor around the vital parts of aircraft has increased considerably and it has been found that the smaller caliber guns could make a number of hits without reaching a vital part, and, therefore, the attacking aircraft would, in many cases, continue the attack.

With conventional guns, as the caliber increases, the weight of the many gun components as well as the gun itself increases greatly. Heavier structural members are needed to load and transfer ammunition. The recoil forces generated require heavier mounting and driving structures. Consequently, aboardship the number of guns that can be installed is limited by the weight factor alone. Furthermore, the handling of conventional large caliber case ammunition presents problems because of its size and weight, such ammunition not being adapted to belt or clip type feeding as used in the machine gun class weapons.

The present invention overcomes many of the disadvantages of the prior art empty case ejection devices associated with rapid fire guns in that it provides an automatic, rapid acting, lightweight mechanism for ejecting empty cases from which rocket assisted projectiles of relatively large caliber are fired. The entire ejection system is relatively small and compact as compared with those in the prior art for similar caliber weapons none of which are capable of handling in any given time interval an equivalent number of empty cases as handled by the present invention. The gun with which the present invention is particularly well adapted for use is provided with a rifled tube and fires a spin-stabilized rocket propelled projectile. The projectile is enclosed in a symmetrical container or case which functions both as a storage case and as an expendable gun chamber when the projectile is fired. This type projectile is fired by the ignition of a reduced powder charge within the container and is propelled through the barrel at a relatively slow velocity. While within the rifled gun barrel, the rocket propellant motor is ignited by the hot gases of the reduced powder charge and thereafter the projectile accelerates to a much higher velocity comparable to conventional projectiles during flight. Sufficient spin is imparted by the rifled tube of the launcher to make the rocket stable as it emerges from the tube. The canted nozzles of the rocket motor provide additional spin during flight. The conventional recoil is substantially eliminated in the present invention because of the low firing pressures produced in the present system. Machine gun rates-of-fire are obtained by the use of expendable gun chambers made feasible by the low powder pressure created when each round is fired. The employment of the expendable gun chambers makes possible the moving of the rocket assisted ammunition laterally into and out of axial alignment with the gun barrel without the necessity of ramming and extracting operations as is common with conventional cased ammunition. Thereafter, the present invention functions to eject the empty cases at machine gun rates of ejection.

Accordingly, an object of the present invention is to provide a rapid fire rocket launching system including a gas operated empty ammunition case handling system for receiving, holding and ejecting the empty case in synchronism with the firing of the gun at all angles of gun elevation and train.

Another object is to provide an ejecting mechanism that is readily removable and replaceable.

An additional object of the present invention is to provide a gun ejection system for guiding and aligning the forward face of each empty round case being ejected and which latches the forward flange of each case to a drive crosshead which drives each case rearwardly to a predetermined point where the case is released.

A further object resides in the provision of a gun ejection system capable of receiving empty ammunition cases of the type aforementioned and neutralize rebound action of the latter as it fully enters the system.

A still further purpose of the instant invention is to provide a gun ejection system capable of restraining an empty ammunition case of the type hereinbefore mentioned against lateral motion.

Another object is to provide a gun ejection system capable of engaging a portion of the empty round case to prevent loss of the latter during periods of medium to high angle firing.

An additional object of the present invention resides in the provision of a gun ejection system which includes an interlock arrangement to prevent firing of the gun in the event a case, during its travel into the ejection mechanism is not properly positioned relative to the case receiving basket assembly.

Other objects and many of the attendant advantages of this invention will be readily appreciated as the same becomes better understood by reference to the following detailed description when considered in connection with the accompanying drawings wherein.

GENERAL MOUNT DESCRIPTION

Referring first to FIGS. 1 through 5 which are general arrangement views of an entire system in which the ejection system of the present invention may be employed, it will be observed that a twin weapon mount, generally designated by numeral 100, is shown mounted on a fixed stand 101 such as those which are presently in use on naval vessels. The mount comprises a platform carriage 102 which supports thereabove gun and round handling mechanisms and carries therebelow mount drive and power components therebeneath. The carriage 102 is rotatably supported for movement in train on roller bearings (not shown) which engage a mating roller path (not shown) formed in a fixed training circle gear 103. A carriage mounted drive pinion 104 is drivingly meshed with the training circle 103 for driving the mount in train. Additional power and associated equipment such as motors, firing cut outs, brakes, clutches and buffers, carried beneath the carriage, form no part of the instant invention and will not be described in detail.

Figure 1:
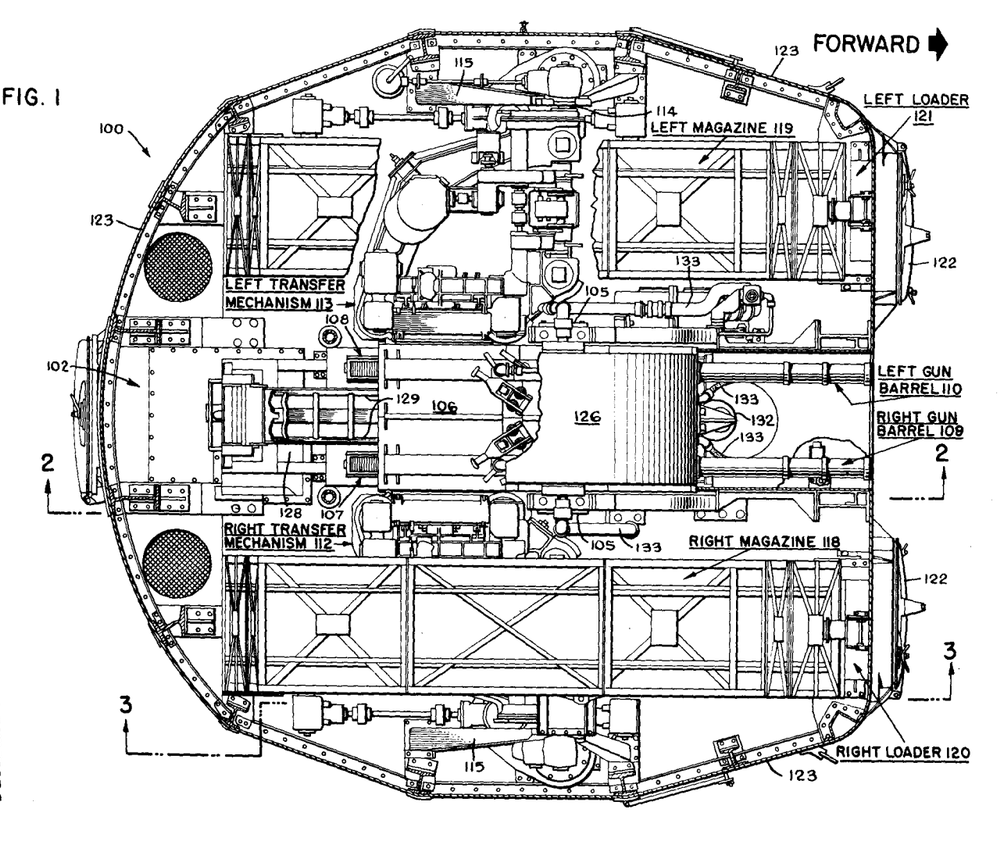
FIG. 1 is a top plan view with portions broken away of a twin gun mount embodying the ejection system of the present invention.
Figure 2:
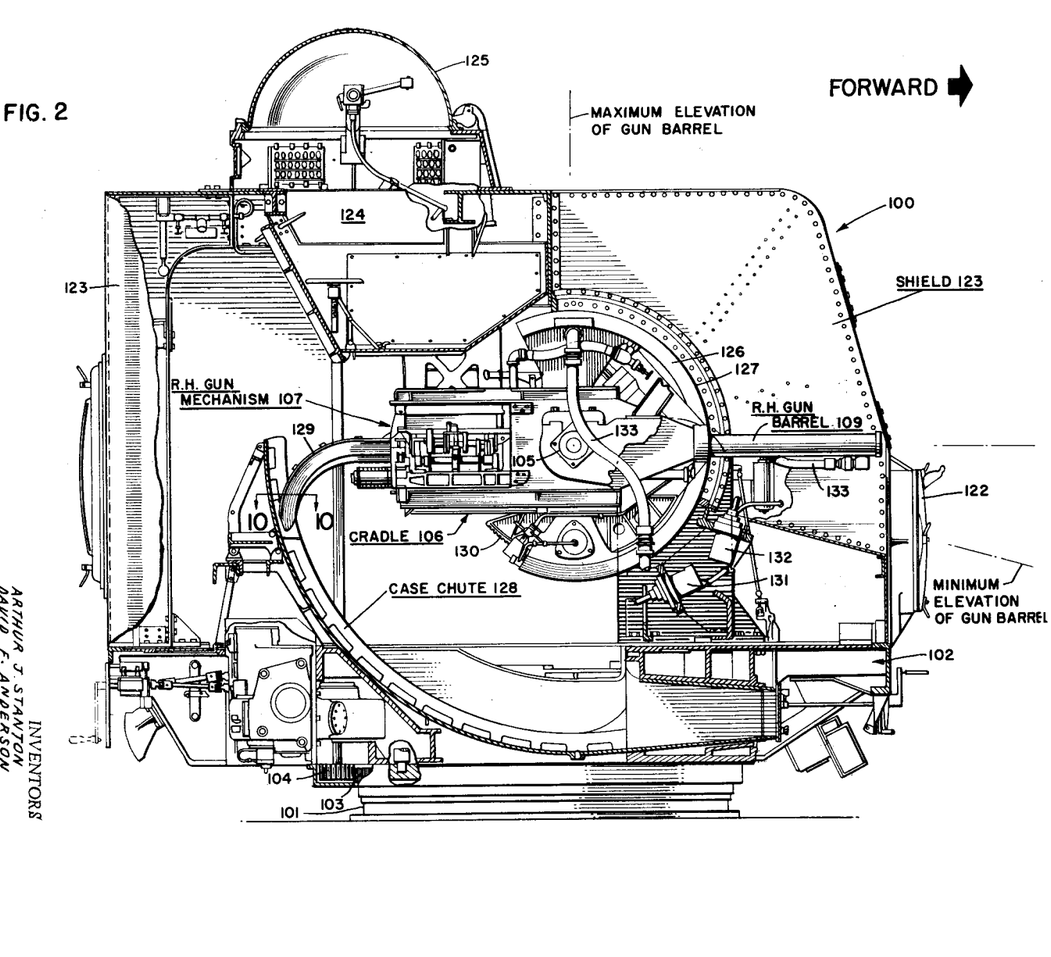
FIG. 2 is a vertical sectional view of the mount of FIG. 1 taken along a line substantially corresponding to line 2—2 of FIG. 1.
Figure 3:
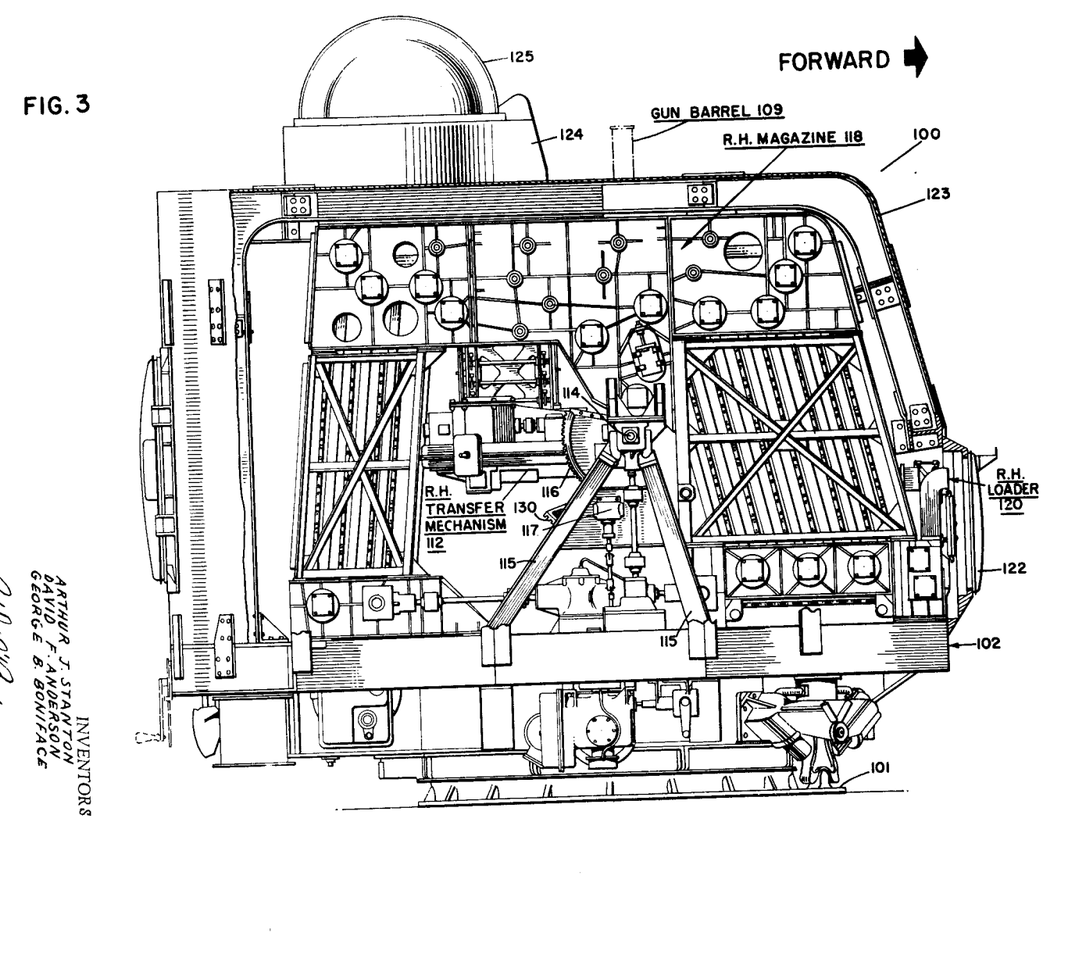
FIG. 3 is a vertical sectional view of the gun mount of FIG. 1 taken along a line substantially corresponding to line 3—3 of FIG. 1.
Figure 4:
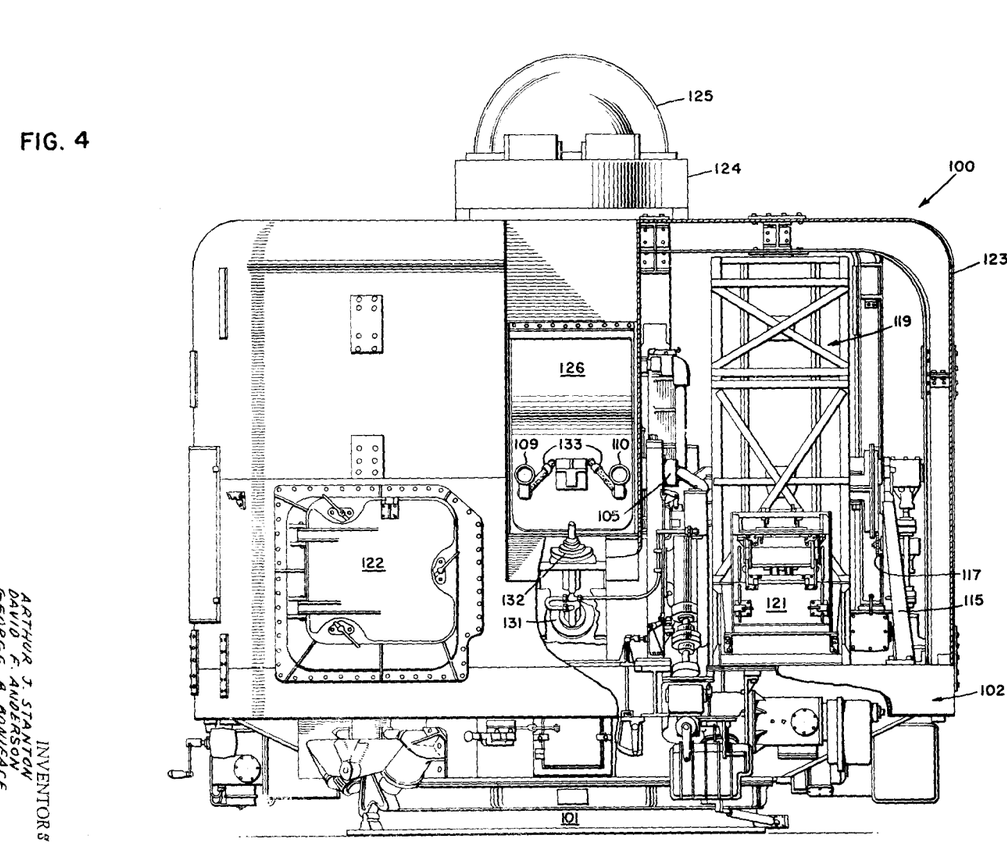
FIG. 4 is a front elevational view of the gun mount of FIGS. 1, 2 and 3 with a portion of the shield broken away to better illustrate the relative locations of certain mechanisms of the gun system.
Figure 5:
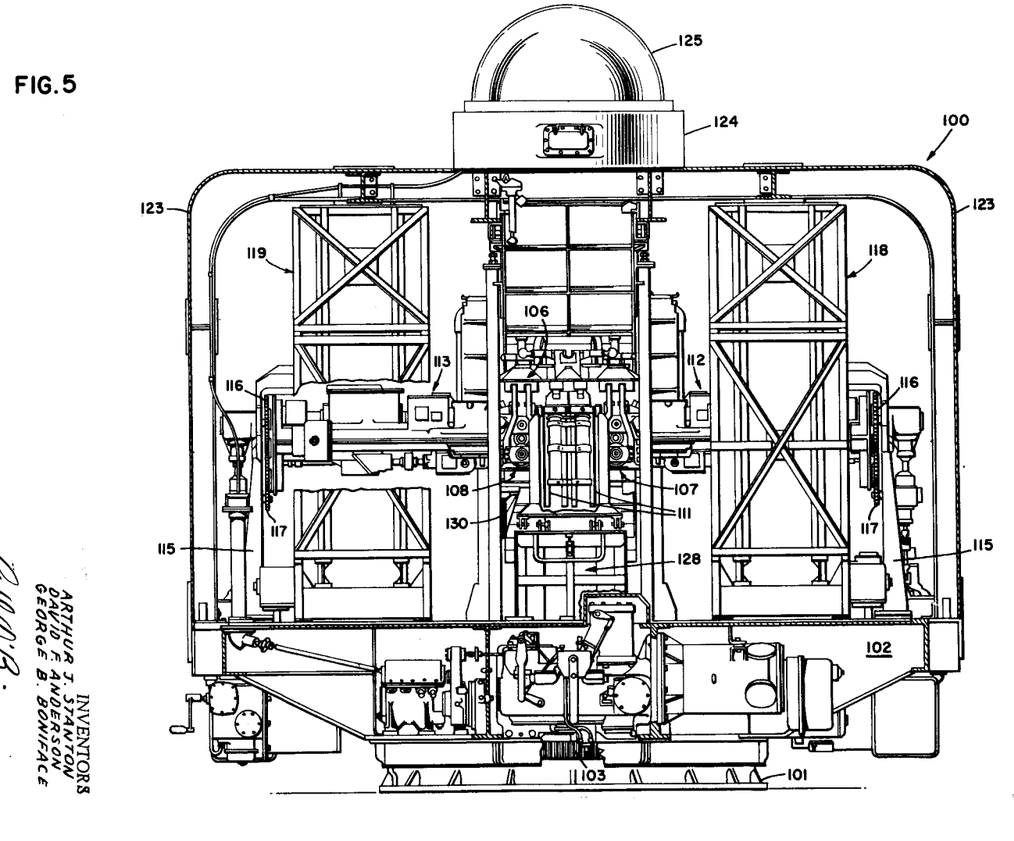
FIG. 5 is a rear elevational view of the gun mount with portions of the shield and stand removed.

Located centrally atop the carriage is a pair of trunnion bearings 105 which support therebetween, an elevatable cradle 106. An elevating arc 130 is secured to the left hand side of cradle 106, as viewed in FIG. 5, and is driven by a conventional elevating pinion (not shown) to move the entire cradle in elevation. An elevation stop buffer 131 and a depression stop buffer 132 are provided, as shown in FIGS. 2 and 4. The central portion of the cradle supports a pair of right and left hand gun mechanisms 107 and 108 each gun mechanism having a rifled barrel 109 and 110, both respectively, protruding from the front portion of the cradle. The twin case ejection system 111 of the present invention is also carried by the cradle and is located between the gun mechanisms. Secured to opposite sides of the cradle and elevatable therewith, are right and left hand round transfer mechanisms 112 and 113, respectively, the outer ends of which are supported in bearings 114 carried by similar right and left hand pedestal 115 secured to the top of the carriage 102. An elevation response arc 116 is also secured to the outboard ends of each round transfer mechanism and is in contact with elevation response gearing 117 connected to suitable firing cutouts during adjustment of gun elevation. In addition, the elevation response gearing repositions certain elements in the transfer mechanism drive gearing to maintain alignment of feed starwheels at the round entry end of the transfer mechanism regardless of angle of gun elevation. This is accomplished by means of suitable differential gearing, not shown. Right and left hand round storage magazines 118 and 119, respectively, are mounted outboard of the cradle on the carriage and overlie the major portion of the top surfaces of each round transfer mechanism. Right and left magazine loaders 120 and 121, respectively, are mounted on the forward and lower front end of each magazine through which rounds may be fed to the magazine to load endless round carrying chains (not shown) moving through each magazine. Access doors 122 permit access to the loader during periods of magazine loading and unloading.

A shield 123 secured to the carriage, completely encloses the mount units and forms a weather seal for the mount units and mount operator. The top central portion of the shield supports a control comparment 124 which includes a transparent observation dome 125 outstanding above the shield. A gun port shield 126 mates with a circular path 127 formed in the shield and may have inflatable waterproof sealing elements (not shown) for sealing the movable elements when in stowed condition.

The fixed case ejection chute 128, formed in the central floor portion of the carriage, is curved to conform with the sweeps of the pair of case deflector assemblies 129 carried by the case ejection system 111 and delivers empty cases out of the front end of the mount. Suitable coolant lines 133 are employed to carry water to and from the gun cooling system. The structural details of the present invention will now be described.

EJECTION SYSTEM

Case Receiving Basket Assembly

After a round has been fired, the forward movement of the operating slide 644 rotates the feed sprocket 611 counterclockwise, thus moving a live round into firing position, and, at the same time, the previously fired round case is moved laterally into a case receiving basket assembly to be later described. The function of the basket assembly and the ejection mechanism is to receive the case, neutralize the rebound action as the case fully enters the basket, retain the case against any lateral motion after rebound has been neutralized, align the case prior to a pushing action by a cooperating ejection cylinder assembly, engage a portion of the case to prevent rearward loss of the latter during periods of medium to high angle firing and operate switch means to prevent firing if a case, during its travel into the ejection mechanism is not properly positioned relative to the basket.

Figure 11:
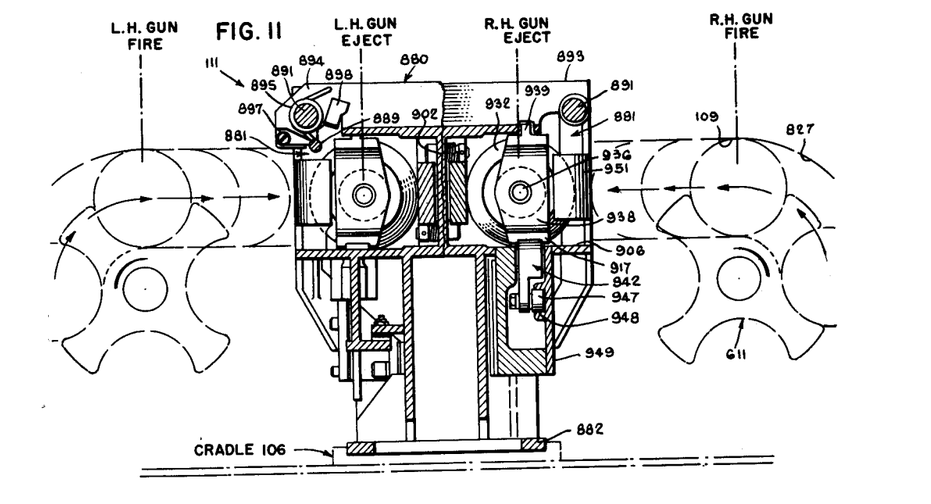
FIG. 11 is a transverse sectional view of the case ejection mechanism taken from the rear and looking forwardly, with the locations of the right and left hand round feed sprockets shown in phantom.

Referring particularly to FIGS. 6 through 12, the case receiving basket assembly 880 includes a unitary pair of right and left hand case receivers 881 and associated mechanisms. These receivers are identical except for reversal of parts, and therefore only one will be described. Each case receiver 881 is mounted between the right and left hand gun mechanisms 107 and 108, respectively. As best illustrated in FIG. 11, the basket assembly 880 is a rectangular structure comprising a flat horizontal base portion 882 supporting each case receiver 881 by means of a pair of vertically aligned, parallel spaced, longitudinal supports 883. The basket assembly is secured to the cradle 106 by means of forward lugs 884 formed integral with the base portion 882 and are received by recesses 885 formed under an L-shaped support 886 for an adjacent case ejector cylinder assembly which is part of the ejection mechanism and which will be later described. The rear end of the base portion 882 is bored to receive a pair of removable pins 888 that secure the base portion to the floor of the cradle 106.

The case receiver 881 is aligned with the upper and lower round guide rails 827 and 637, respectively, of the gun mechanism. Thus the path of the ejected round case is substantially along a horizontal plane and normal to the gun barrel. As the round case is ejected, first it contacts a longitudinally extending, case retaining bar 889 fixed to a rotatable spring biased pivot shaft 891 which, in turn, is journalled in front and rear bearings 892. These bearings are mounted in cross support bars 893 at each end of basket assembly 880 and adjacent the top of each case receiver 881. A pair of similar cross support bars 894, each of which secures one end of coiled tension springs 895, are secured intermediate support bars 893. The opposite spring ends are affixed to inwardly extending ears 896 fixed to the pivot shaft 891 adjacent bearings 892. As shown in FIG. 11, outward swinging movement of the retainer bar 889 is limited by the bar striking stop blocks 897 mounted on the support bars 894. Inward displacement of the retainer bar 889 by the round is halted by inner stops 898 also secured to support bars 894. As the case passes under and beyond the retainer bar 889, the case strikes a spring loaded buffer bar 901 having substantially the same mass as the empty round container. Buffer bar 901 is secured to a vertical partition wall 902 which separates the case receivers 881. The mass of the bar is sufficient to stop the case, the bar then passing the absorbed energy to its springs with minimum rebound of the bar. During this period immediately after passage of the round case thereunder, the retainer bar 889 will swing outwardly and the round case is now secured in the case receiver against lateral motion.

Figures 6, 7, 8:
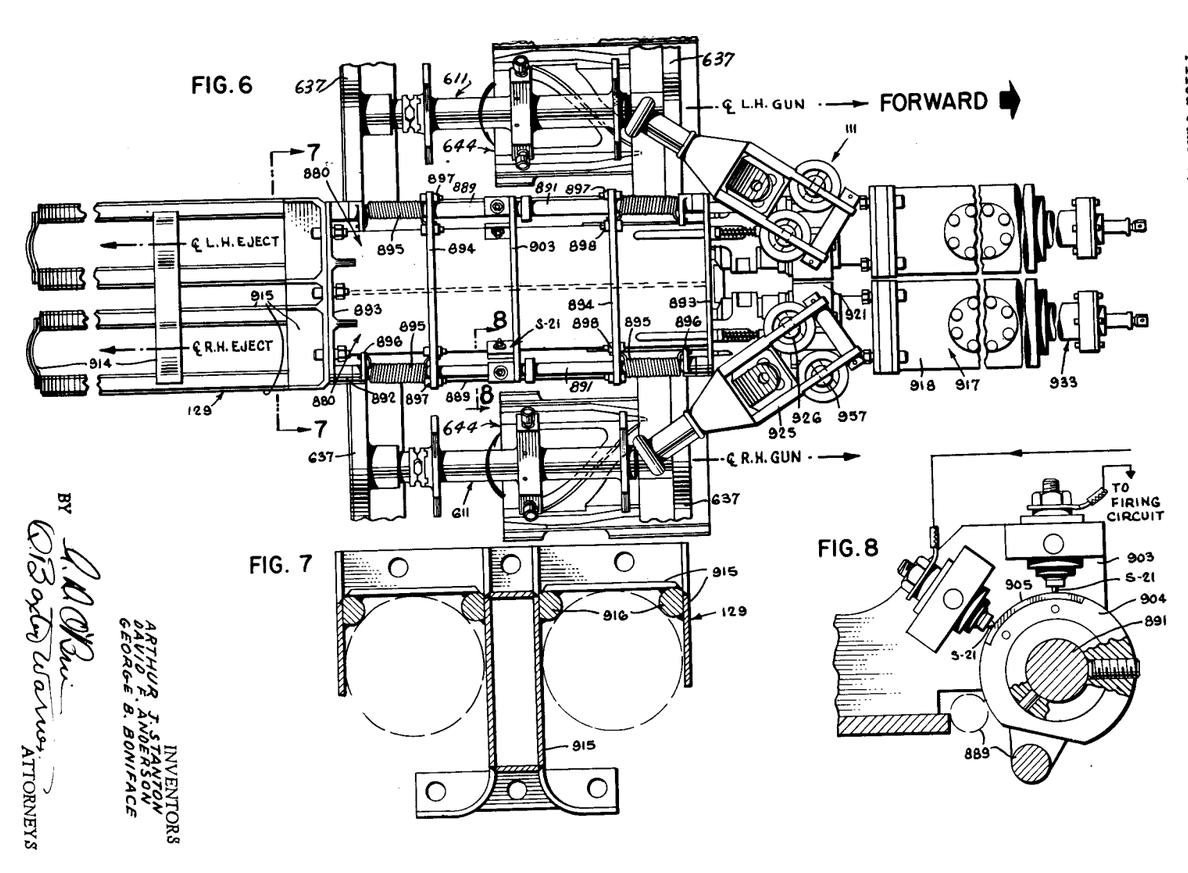
FIG. 6 is a top plan view of the right and left hand case ejection systems with the feed sprockets for right and left hand gun mechanisms also shown to illustrate the direction of round case movement into the ejection sysem.
FIG. 7 is a vertical sectional view of the case ejection chute taken along a line substantially corresponding to line 7—7 of FIG. 6.
FIG. 8 is an enlarged transverse sectional view of a firing switch interlock and switch opening means therefor taken along a line substantially corresponding to line 8—8 of FIG. 6.

A centrally located cross support 903 carries a pair of switch contacts S–21 at each end thereof, the contacts engaging a cooperating circular switch cam 904 mounted on pivot shaft 891. The cam 904 is insulated about its circumference except for a 90° arcuate contact strip 905 which engages the two switch contacts simultaneously when the retainer bar is in its extreme outward or round retaining position, as shown in FIG. 8. These switches are connected in the firing circuit in any suitable manner so that when the case is not aligned or all the way in the case receiver 881, contact from switch to switch will not be made, thus breaking the firing circuit to prevent firing of the gun.

The weight of the round case is supported by a smooth horizontal shelf portion 906 of the case receiver 881 and a rear flap portion 907 which is slightly yieldable in a downward direction in order to frictionally engage the rear flange of the case. The flap portion 907 has a flat horizontal plate 908 forming an extension of the shelf portion 906, the plate 908 having a depending vertical flange 909 pivoted at 911 to the lower surface of the shelf portion 906. A downwardly and forwardly inclined finger 912 of the flange is connected by a tension spring 913 to a rear plate of the basket assembly 880 thus holding the horizontal plate 908 in alignment with the shelf portion.

A case deflector assembly 129 is mounted on the upper rear end of the basket assembly and comprises a similar pair of inverted, U-shaped case guide supports 915, each extending horizontally and rearwardly for a short distance and then assuming a downwardly mating curve with a stationary carriage mounted ejection chute 128. The supports 915 are open at their bottom edges and connected at their top edges by a series of spaced cross bars 914. At the junction of the side walls and the top of supports 915, a pair of case guide rails 916, are provided to contact the case flanges during rearward movement of the case into the ejection chute 128. The speed of the ejected case is such that bottom guides are not needed, the case flanges engaging only these upper rails with a minimum of friction. Due to this construction, particularly referring to FIG. 10, the flanges of the rounds protrude a short distance outside the case guide rails. Thus the first contact of the case flange is made centrally of the stationary chute without drop-off and resulting tumbling of the rapidly moving cases.

*Case Ejection Mechanism*

A case ejection mechanism 917 is mounted forwardly of case receiver 881 and axially aligned therewith. This mechanism functions in cooperation with the case receiver to guide and align the forward face of the case being ejected. This mechanism 917 also latches the forward flange of the case to a drive crosshead, which drives successive cases rearwardly at proper cyclic intervals. During this rearward movement each latched case is released at the proper time in order not to hinder the free driven motion thereof rearwardly through and out of the case receiver.

The mechanism 917 includes an elongated cylindrical housing 918 rigidly secured to and supported by the support 886 which is supported by the cradle 106, as aforementioned.

The support 886 is provided with a flat base portion 919, a rear cylinder receiving support block 921 and a central and forwardly extending vertical rib 922 which carries on its forward end an angle bracket 923 bolted to a mating angle bracket 924 secured to the forward end of the cylinder housing 918.

Figure 9:
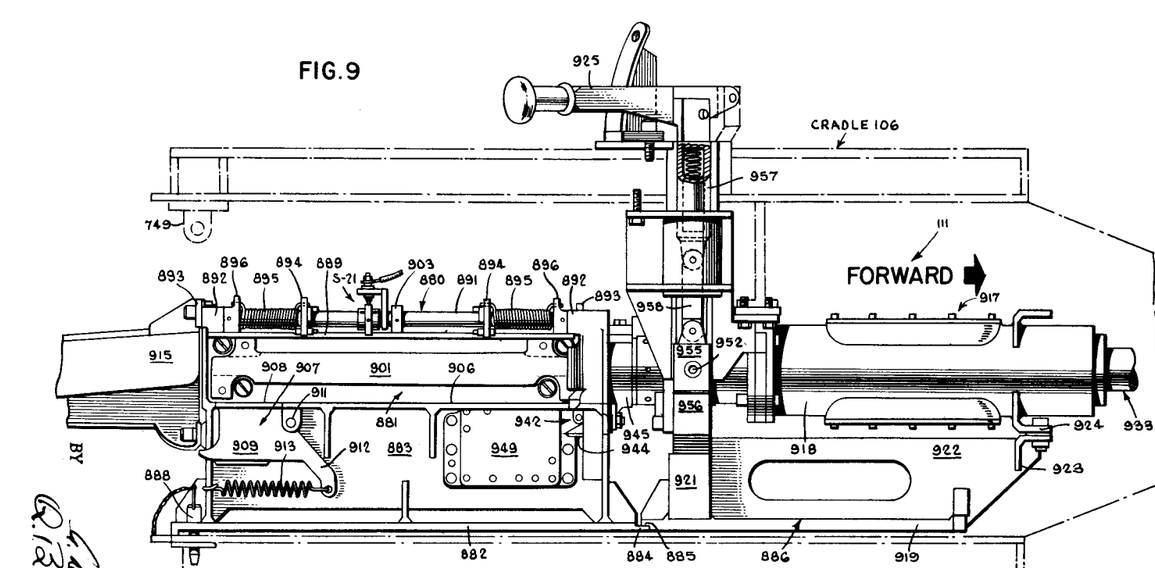
FIG. 9 is a side elevational view of the round case ejection system with the cradle being shown by broken lines.
Figure 10:
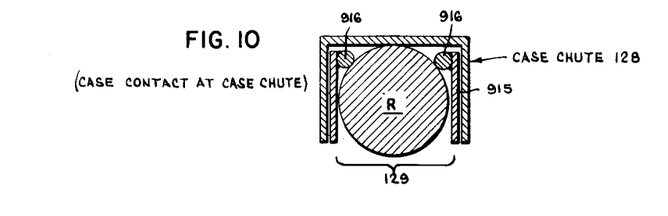
FIG. 10 is a horizontal sectional view through the case deflector assembly disclosing the manner in which the empty case makes contact with the case chute as viewed from a section line substantially corresponding to line 10—10 in FIG. 2.

As best viewed in FIGS. 6 and 9 the base portion 919 is supported and aligned by a mating groove (not shown) formed in the floor of the cradle, this serving to secure the support 886 against lateral motion. A readily releasable lever 925 is pivotally mounted to the top of the cradle and operates a locking pin 926 which is pivotally secured thereto. Pin 926 secures the support 886 against longitudinal motion by reason of the pin engaging a recess, not shown, formed in the upper end of the rear face of the support block 921. Release of lever 925 permits ready and rapid removal of ejection mechanism 917.

The support block 921 is bored to receive a portion of the cylinder housing 918 which is locked in position by means of upper and lower locking plates 928, bolted to the rear face of the block and engaging a circumferential recess 929 formed in the cylinder housing 918.

Figure 12:
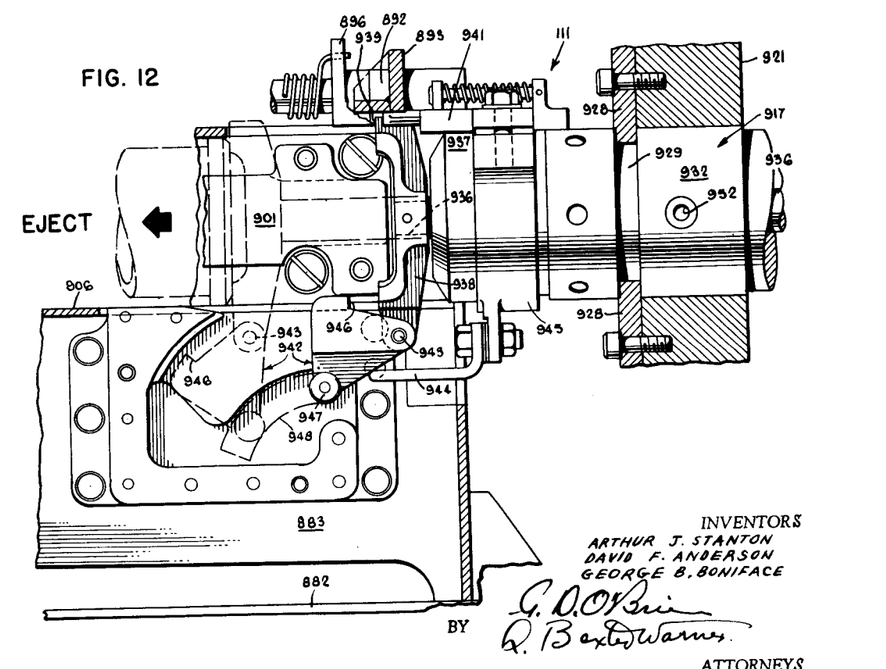
FIG. 12 is an enlarged side elevational view of a portion of the ejection mechanism of FIG. 11, showing the case ejection crosshead latch and operating cam means therefor.

As shown in FIGS. 11 and 12 the cylinder housing 918 comprises any suitable piston arrangement in which the piston is moved rearwardly when a round is fired in response to high pressure gases being transferred from the barrel to the cylinder and against the piston via suitable means for porting such gases such as port 952, for example. One such piston arrangement which has proved particularly satisfactory is that disclosed in copending application Serial No. 663,320, filed June 3, 1957, for Gas Operated Motor.

The rearward extension 936 of the piston rod in the piston arrangement passes through a journalled cylinder end retaining cap 937 which is threadably secured to the cylinder 932. An end of this extension 936 receives a case engaging crosshead 938 which is so formed as to engage only an upper and lower segmental portion of the flange rim of the case. The upper end of the crosshead has a central raised lug 939 (FIG. 12) which is engaged (on a return stroke) by a spring urged guide 941 mounted on cylinder 932. The lower end of the crosshead 938 (FIGS. 11 and 12) carries a case flange rim latch 942 pivoted at 943 and extending rearwardly of the crosshead. The latch, being free to pivot downwardly on a rearward stroke of the crosshead, is maintained in an upright and case engaging position by support finger 944 which is rigidly secured to a stationary collar 945 encircling the rearward end of cylinder 932. The upper end of latch 942 is notched at 946 so as to engage the rear face of the case flange while the lower end carries a cam actuated roller 947 which moves in an arcuate cam guide 948 formed in plate 949 which is secured to the forward end of the basket assembly 880. Therefore, on rearward movement of crosshead 938, latch 942 moves away from the fixed support finger 944 and is then guided in a curved counterclockwise, downward direction to clear the case flange as the latter is driven rearwardly. Return motion in the forward direction will then reset the latch to again engage the forward flange of the next case to be ejected. Each incoming case to be ejected is guided into correct position with respect to crosshead 938 by means of a vertical inwardly extending member 951. Member 951 forms a guide for the front face of the case at the time the case moves from the end of the gun mechanism rails into the case receiver 881.

SUMMARY OF OPERATION

Simultaneously with the movement of the live round into firing position, the previously fired round case is moved laterally into the case receiving basket assembly by the rotation of feed sprocket 611. The ejection mechanism functions to receive the case, neutralize the rebound action as the case fully enters the basket assembly, retains the case against any lateral motion after rebound has been neutralized, align the case prior to a pushing action by the ejection cylinder assembly, engage a portion of the case to prevent rearward loss of the round during periods of medium to high angle firing, and operate switch means to prevent firing if the case, during its travel into the ejection mechanism, is not properly positioned relative to the basket assembly.

The first portion of the path of the round case being ejected is substantially along a horizontal plane and normal with the gun barrel. The case first contacts the longitudinally extending case retaining bar 889 and displaces the latter inwardly to pass thereunder. As the case passes under and beyond the retainer bar 889, the case strikes a spring mounted buffer 901 secured to the vertical partition wall 902. The retainer bar 889 swings outwardly after the passage of the round case thereunder to secure the case against lateral movement in the case receiver 881. In the event that a round case is not properly aligned or all the way in the case receiver, the firing circuit will be opened by the operation of switch contacts S-21, and the gun will not fire.

The case ejection mechanism 917 functions in cooperation with the case receiver to guide and align the forward face of the case being ejected. The case ejection mechanism also latches the forward flange of each case to the drive crosshead 938. This crosshead drives the successive cases rearwardly at proper cyclic intervals and, during this rearward movement, sequentially releases each latched case in order not to hinder the free driven motion thereof rearwardly through and out of the case receiver 881.

On rearward movement of the crosshead 938, latch 942 moves away from the fixed support finger 944 and is then guided in a curved counterclockwise, downward direction to clear the case flange as the latter is driven rearwardly. The latch is reset during the return motion of the crosshead in the forward direction to again engage the forward flange of the next case to be ejected. The vertical inwardly extending member 951 guides each incoming case to be ejected into the correct position with respect to crosshead 938. The crosshead is driven by any suitable piston arrangement such, for example as that disclosed in copending application Serial No. 663,320, aforementioned.

Obviously many modifications and variations of the present invention are possible in the light of the above teachings. It is therefore to be understood that within the scope of the appended claims the invention may be practiced otherwise than as specifically described.

What is claimed is:

1. For use with an automatic weapon having a barrel, a gun receiver communicating with said barrel and defining a passage extending normal to said barrel, means in said gun receiver for moving encased rounds to be fired into alignment with said barrel and for moving cases through said passage out of said gun receiver after firing, a case ejection system including the combination of: receiving means for said cases positioned adjacent said gun receiver and communicating therewith through said passage, detent means partially obstructing said passage at the adjacency of said receiving means and said gun receiver and movable upon contact with cases moving through said passage, switch means carried by said detent means for controlling the firing of said rounds, buffer means interiorly positioned in said receiving means for absorbing the impact of received cases and rammer means including means reciprocably movable within said receiving means in response to firing to positively eject said cases as said rounds are fired.

2. The case ejection system set forth in claim 1 wherein said receiving means comprises a housing having a vertical wall member laterally spaced and horizontally aligned with the passage in said gun receiver, a lower floor member laterally extending from said vertical wall member for supporting the case being ejected, a series of upper guide members vertically spaced from said lower floor member, said vertical, lower and upper members defining a U-shaped channel.

3. The case ejection system set forth in claim 1 wherein said buffer means comprises a striker bar movably mounted in said receiving means and having a mass substantially equivalent to that of the round case being ejected, and resilient means normally biasing said bar into a case engaging position.

4. The case ejection system set forth in claim 1 wherein said detent means comprises a bar pivotally carried by said receiving means and yieldable in one direction upon contact with a round case entering said receiving means and secured against movement in the opposite direction beyond a predetermined point after case entry has been accomplished, resilient means for biasing said bar toward a predetermined position and into engagement with round cases being ejected, and limit means for said bar for restraining the round case being ejected against lateral motion after being buffered in said receiving means.

5. The case ejection system set forth in claim 1 wherein said rammer means comprises a piston and cylinder arrangement, means for porting gases from said barrel to said cylinder as a round is fired, means reciprocably carried within said cylinder for movement in one direction when said round is fired, case latching means carried by the reciprocable means, means for normally biasing said latching means into latching engagement with the round case being ejected during angular change in attitude of said receiving means, and latch release means operable in response to movement of said reciprocable means in the one direction.

6. The case ejection system set forth in claim 1 wherein said switch means is connected to a firing circuit and actuated in response to the detent means reaching a predetermined position, said switch means including a first contact for connection to a source of electrical energy, a second contact for connection to a firing circuit, and bridging means connecting said first and second contacts when said detent means is in open position and breaking said circuit when said detent means is partially closed.

7. The case ejection system set forth in claim 2 wherein said lower floor member further comprises a fixed portion and a yieldable portion carried adjacent one end and normally aligned with said fixed portion for effecting frictional engagement with one end of the round case being ejected.

8. The case ejection system set forth in claim 5 wherein said case latching means comprises a ramming head connected to said reciprocable means, said ramming head being disposed for engagement with the flanged end of a round case being ejected, latch means carried by said ramming head for maintaining the flanged end of the case being ejected in engagement with said ramming head during the interval of time required for the positioning of said reciprocating means during the case receiving operation and for releasing the flange end of the case during the case ejection operation.

9. The case ejection system set forth in claim 8 wherein said case latching means comprises a rim latch pivotally mounted on said ramming head, an abutment formed on said rim latch for engagement with a portion of the round case flange, support means for maintaining said rim latch in a case engaging position, release means for releasing the flanged end of the round case, and contact means on said rim latch for engagement with said release means during the case ejection operation.

10. The case ejection system set forth in claim 9 wherein said latch release means comprises a housing mounted adjacent said rim latch, cam means carried in said housing in engagement with said contact means for effecting said rim latch to move in an angular path relative to that of said rammer head.

No references cited.